United States Patent [19]

Perrott

[11] Patent Number: 5,771,088
[45] Date of Patent: Jun. 23, 1998

[54] CONTACT LENS DESIGNED TO ACCOMMODATE AND CORRECT FOR THE EFFECTS OF PRESBYOPIA

[75] Inventor: Colin M. Perrott, Portola Valley, Calif.

[73] Assignee: Pilkington Barnes Hind, Inc., Sunnyvale, Calif.

[21] Appl. No.: 525,779

[22] PCT Filed: Mar. 22, 1994

[86] PCT No.: PCT/US94/03042

§ 371 Date: Sep. 27, 1995

§ 102(e) Date: Sep. 27, 1995

[87] PCT Pub. No.: WO94/23327

PCT Pub. Date: Oct. 13, 1994

[30] Foreign Application Priority Data

Mar. 27, 1993 [GB] United Kingdom ............ 9306424

[51] Int. Cl.⁶ .................................................. G02C 7/04
[52] U.S. Cl. ...................................... 351/161; 351/160 R
[58] Field of Search ........................ 351/160 R, 160 H, 351/161, 162; 623/5, 6

[56] References Cited

U.S. PATENT DOCUMENTS

| 4,195,919 | 4/1980 | Shelton ............................ 351/160 R |
| 5,147,393 | 9/1992 | Van Noy et al. .......................... 623/6 |
| 5,217,489 | 6/1993 | Van Noy et al. .......................... 623/6 |
| 5,225,858 | 7/1993 | Portney ................................. 351/161 |
| 5,349,396 | 9/1994 | Roffman et al. ................... 351/160 R |
| 5,405,384 | 4/1995 | Silvestrini ................................ 623/5 |

*Primary Examiner*—Scott J. Sugarman
*Attorney, Agent, or Firm*—Burns, Doane, Swecker & Mathis, L.L.P.

[57] ABSTRACT

A contact lens is disclosed which has a first optical zone (2) adapted to compensate for spherical aberration and at least one additional zone (3) which is configured to provide improved peripheral vision. Generally, the first optical zone is shaped to provide an aspheric surface and the additional zone or zones is shaped to provide a refractive power not greater than the first zone, the difference in the refractive powers of the zones being no more than about 0.75 diopter.

18 Claims, 1 Drawing Sheet

CONTACT LENS DESIGNED TO ACCOMMODATE AND CORRECT FOR THE EFFECTS OF PRESBYOPIA

BACKGROUND OF THE INVENTION

1. Field of the Invention

The present invention relates to contact lens designed to accommodate and correct for the effects of presbyopia, myopia and hyperopia and, in particular, to such lenses which are provided with characteristics to compensate for defects associated with peripheral vision.

2. State of the Art

In the design of ophthalmic lenses, it is an aim that the optics of a lens used to correct vision ideally provide precise refractive correction and do not add to the natural aberrations within the eye. However, good vision is dependent upon several factors: visual acuity, contrast sensitivity, high defocus perception threshold, good visual performance (speed and accuracy of recognition), tolerance to illuminant intensity, and tolerance to illuminant color.

These are somewhat interdependent and all degrade with age.

Contact lenses provide an opportunity by which some of these effects are countered by appropriate optical design, since the lens and the eye are in close physical proximity, compared to spectacles, and optical alignment is consequently easier to achieve.

It is well known that visual performance is degraded by contrast and object size reduction and is generally improved by higher illuminant intensity. However, with age, the illuminant intensity becomes the most dominant factor with respect to visual performance. For instance, a work force in its early forties will require 50 to 100% higher lighting levels than a work force in its early twenties to do the same visual tasks at the same efficiency level. Further, the younger population is highly tolerant to varying light levels, and with age the population becomes very sensitive to light level. This is linked to the fact that younger people can operate effectively over the whole visible spectrum, while the vision of older people can be impaired severely at the blue end of the visible spectrum. Consequently, the older a person is the more sensitive to the spectral content of lighting he becomes. This aspect also varies greatly on an individual basis.

There is always, in the human eye, a certain degree of intrinsic spherical aberration. This is the primary cause of unwanted blur in the retinal image. This blur is due to rays which pass along the axis of the eye (paraxial rays) and which are focussed slightly behind the fovea, whereas rays which pass through the outer regions of the pupil are focussed in front of the fovea. In fact, at the outer limit set by the iris (peripheral rays), the focus is substantially myopic. Accordingly, there is always a part of the image received by the human eye that is blurred. The mechanics of the human eye and the function of the human brain, in general, compensate for this. With age, in particular, the degree of this lack of focal clarity increases to the point that the human eye and brain cannot accommodate for this and some means of focal correction is called for.

In addition to the above visual problems with the human eye, there are some further physical problems with the human eye. For example, the human eye mechanism is designed to operate internally as a sphere, with the surface of the cornea, onto which a contact lens is placed, also being spherical. As will be appreciated, this is not always the case. This lack of sphericity in the surface of the cornea can cause problems in the optical performance of the human eye, as well as in the fitting of contact lenses. Consequently, over the years the industry has disclosed a way of compensating for this by what has become commonly called a toric lens.

Specifically, toric contact lenses are contact lenses which are adapted to optically compensate for the non-sphericity of the cornea of the human eye. This can be done by building optical correction components into the back surface of the contact lens, that is the surface of the contact lens which is in contact with the cornea of the eye when fitted, or in the front surface of the contact lens.

One known approach for the design of contact lenses in an attempt to alleviate this problem employs an aspheric front surface on an otherwise conventional contact lens to compensate for the spherical aberration of the eye and therefore decrease the amount of blur such that the paraxial rays can be accommodated. The preferred surface is preferably hyperbolic or parabolic (according to well established convention) and places a higher (approximately by 1D) refractive power at the center of the lens, compared to the outer part of the optic zone. Properly executed, this design approach results in a focal spot at the fovea for all rays entering the eye, giving the best depth of field and greatest image clarity. This form of lens fit is known as an "aplanatic fit". The design objective is to create an image of such a quality that blur originating in astigmatic distortion or accommodation loss via presbyopia can be tolerated without specific design attention.

The normal response of the eye to intense stimulation of the retinal detectors is a constriction of the iris. With a reduced pupil size, the image is formed more or less exclusively at the paraxial focus. It approaches optical perfection. The best vision is always achieved in bright illumination. With age, the absorption and scattering of light inside the eye steadily reduces the intensity of stimulation at the retina for a given ambient light level and, so, the natural facility of achieving a pure paraxial focus is impaired, unless brighter lighting is used to compensate.

An aspect of the aplanatic fit is that the single focal spot is achieved for all pupil sizes. Therefore, the image quality is not degraded at larger pupil sizes. In addition to being useful in overcoming focussing disabilities, this design concept provides a lens by which the quality of visual focus is made to be essentially independent of illuminant level.

The image of a distant object can also be blurred by virtue of spherical aberration, with peripheral rays being focussed in front of the retina. Distant objects viewed by the eye are brought to focus at the fovea via the paraxial regions of the eye. The complete field of proximate objects as close as 1 meter away is also focussed on the retina to some degree by virtue of the aberration. The closest objects are framed via the peripheral focus. Thus, an individual can be concentrating on a distant scene via the foveal image but retains a clear perception of other objects nearby by virtue of this indirect (or peripheral) vision. Local movement is the common stimulus for shifting attention and responding appropriately.

By the use of a lens giving a fully aplanatic fit, the lens designer disables the natural indirect (or peripheral) vision. Only the field to which specific attention is directed is brought to focus. Objects peripheral to this scene will always be out of focus, the more so the closer they are. Response to the indirect field will be suppressed.

The present invention is concerned with alleviating this problem whilst providing the benefits of an aplanatic lens fit.

SUMMARY OF THE INVENTION

In accordance with one aspect of the present invention there is provided a contact lens designed to accommodate and correct for the effects of presbyopia in a wearer, which contact lens has a front surface, and a back surface which is in contact with the cornea of the eye of a wearer in use and which contact lens comprises:

a primary or first optical zone which is provided with characteristics to compensate for spherical aberration in the eye of a wearer and has a first refractive power, said first optical zone being sized upon the characteristic of the wearer, and at least one other secondary optical zone having a spherical surface and having an optical refractive power no greater than that of the first optical zone;

the configuration being such that at least one other secondary optical zone is provided to provide the wearer with an amount of peripheral vision.

DETAILED DESCRIPTION OF THE INVENTION

Figure 1:
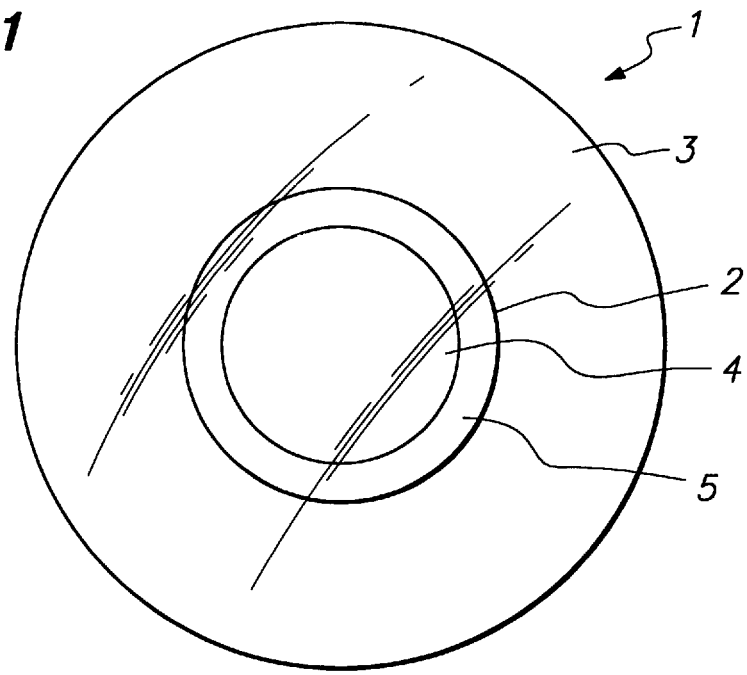
FIGS. 1 and 2 illustrate different embodiments of contact lenses of this invention.

The design of contact lens described herein creates a contact lens which provides maximum clarity to the image with a reduced sensitivity to illuminant levels throughout the range of normally 5 accepted standards of industrial and recreational lighting. The secondary optical zone(s) is designed to preserve the peripheral vision for the wearer in the circumstances where this becomes essential, for example, in dim light or extreme fatigue. Without this feature, the lens would tend to create a tunnel vision effect, preventing the wearer from perceiving peripheral obstacles. Because the difference in focal power of the zones thus described will be within the blur tolerance limit of the human eye (0.75 diopters), each zone provides supplementary intensity for the image held in focus via the other. In other words, the difference between the refractive powers of the two zones is up to about 1 diopter, preferably up to about 0.7 to 0.8 diopter.

In this way, contact lenses made in accordance with the present invention enable a wearer to appreciate the benefits of an aplanatic fit lens in conditions of highlight intensity, whilst in low light or dim conditions appreciate the advantages of having acceptable peripheral vision.

In a preferred arrangement of the present invention, the first optical zone comprises a central circular portion having a diameter of between 4 and 6 mm dependent upon the characteristics of the wearer, and the at least one other secondary optical zone comprises an annular member which circumferentially surrounds said disc-like portion of the first optical zone and has an outer diameter of at least 8 mm.

Preferably, the central optical zone has a diameter of between 4.5 and 5.5 mm, and the outer optical zone has an outer diameter of at least 8 mm.

In one embodiment, the front surface of the first optical zone (or central optical zone) has an aspheric curved surface. Preferably, this aspheric curved surface is parabolic or hyperbolic in shape.

Alternatively or additionally, the back surface of the first optical zone (or central optical zone) has an aspheric curved surface. Preferably, this aspheric curved surface is parabolic or hyperbolic in shape.

When both the front and rear surfaces of the first optical zone are aspheric, the effects of the asphericity of both of the surfaces will combine to provide, and produce, the required effect in order to reduce the spherical aberration in the eye of the wearer.

In accordance with a further embodiment of the present invention, the reduced effects of spherical aberration are enhanced or brought about by means of the inclusion of a volume of a second optical material in the contact lens. This volume of a second optical material will have different optical properties to that of the remainder of the contact lens, such as a different refractive index. The fusion of materials of different refractive index is described in Summerville, Plastic Contact Lens, Noyes Data Corporation, Park Ridge, N.J. (1972), especially pages 69–71. The difference in the optical properties between the volume of the second optical material and the material of the remainder of the contact lens can enhance the desired aplanatic effect and/or peripheral vision aspect of the present invention.

In a still further arrangement of the present invention, the volume of the second optical material is encased in the material of the remainder of the contact lens.

The volume of the second optical material can be provided as one or more segments of the contact lens which are in contact with at least one side of the material of the remainder of the contact lens.

Preferably, the optical power of the first optical zone (or central optical zone) will vary in the range 0.5 to 0.75 diopters from the center of the contact lens.

In a further embodiment, the present invention can be shaped as a toric contact lens, either the back surface or the front surface of the contact lens or with purely spherical contact lenses.

Preferably, any toricity correction in the contact lens is accommodated into the surface of the lens which is not otherwise optically corrected.

In accordance with the invention, the limitation of the optical power variation to the range of 0.5 to 0.75 diopters from the center of the lens places less stringent demand on the eye to accommodate the signals received. Consequently, the lens will be more easily accepted.

In the preferred arrangements of the present invention, the at least one other optical zone (or outer optical zone) has an optical power which is between 0 and 1.5 diopters, most preferably 0 and 1 diopter, weaker than that of the first optical zone (or central optical zone).

Reference will now be made to the accompanying Figures, by way of example, wherein:

FIG. 1 shows a first embodiment of the invention; and

Figure 2:
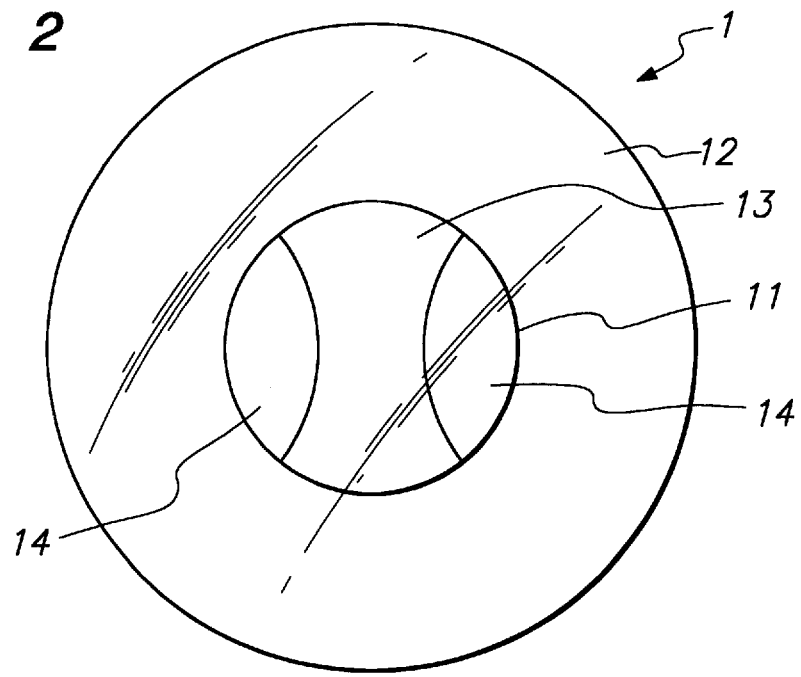

FIG. 2 shows a second embodiment of the invention.

With reference to FIG. 1, there is shown a first basic design of a contact lens 1 made in accordance with the present invention.

The contact lens 1 has an optical zone 2 and a skirt section 3. The optical zone 2 of the contact lens 1 is the part of the contact lens 1 which when the contact lens 1 is correctly mounted on an eye, focuses light onto the retina. The optical zone 2 comprises a central optical zone 4 and an outer optical zone 5 which circumferentially surrounds the central optical zone 4. The central optical zone 4 and the outer optical zone 5 have a common axis about which, or in relation to which, they circumferentially extend.

The skirt section 3 is the part of the contact lens which, when the contact lens is on the wearer's eye, overlies at least the outer portion of the iris and a small part of the sclera adjacent the iris. The section 3 helps to provide sufficient adhesion to hold the contact lens in place and in the correct alignment for optimum performance on the wearer's cornea.

The skirt section 3 of the contact lens 1 circumferentially surrounds the optical zone 2 so that the central optical zone 4, outer optical zone 5 and skirt section 3 are all coaxial with one another. Consequently, the outer part of the central optical zone 4 is in contact with the inner part of the outer optical zone 5 and the outer part of the outer optical zone 5 is in contact with the inner part of the skirt section 3.

In this basic design of contact lens, the central optical zone 4 is configured to compensate for spherical aberration in the eye of a wearer and is of a refractive optical power $O_X$ and the outer optical zone 5 has an optical refractive power which is no greater than $O_X$ with a nominally spherical shape.

With reference to FIG. 2, there is shown a second basic type of contact lens 1 made in accordance with the present invention.

The contact lens 1 has two generic optical zones which are coaxial with each other, these are the optical zone 11 and the skirt section 12 which circumferentially extends around the optical zone 11.

The optical zone itself has two distinct areas of refractive optical power. These are the first optical zone 13 and the second optical zone 14.

The first optical zone 13 is the zone of the lens which provides the corrective refractive power Og and which has characteristics to compensate for spherical aberration in the eye of the wearer. This zone 13 has an hour glass type shape which is formed by virtue of the fact that the optical zone 11 has diametrically opposed portions cut out from the overall circular configuration.

The diametrically opposed portions cut out from the overall circular configuration of the optical zone 11 are in contact with the zone 13 and together constitute the second optical zone 14. This second optical zone 14 has a refractive power which is no greater than that of the first optical zone 13.

The aplanatic type contact lens is designed with an optical power variation of 1 diopter across the lens from its center. With this range of optical power variation the accommodation of the human eye approaches a limit, and in some cases the human eye will not be able to make the necessary accommodation. This will limit the applicability of these lenses.

The at least one other optical zone (or outer optical zone) is described as nominally spherical. Essentially, the other optical zone(s) (or outer optical zone) shows characteristics with regard to light transmission which are far more spherical in behavior than those shown by the first optical zone (or central optical zone). In fact, generally the other optical zone (or outer optical zone) will be spherical in its optical transmission properties. However, in circumstances where it is beneficial to provide the other optical zone(s) (or outer optical zone) with a degree of a sphericity in order to sharpen up the image perceived by the peripheral vision of the wearer, this can be done. The term nominal spherical is used to cover this situation and, as such, includes some asphericity.

As with most optical/ophthalmic devices, the optical quality of any product is greatly dependent on the optical transmission properties of the material from which it is manufactured. In this case, the contact lens is primarily intended for use by presbyopes or immediate prepresbyopes who are exhibiting the effects of presbyopia, and it is affecting their visual performance. Obviously, for the reasons as discussed earlier concerning light scattering, it is intended to avoid any unnecessary effects from scattering of the light by the material chosen for the contact lens. Therefore, even though contact lenses made in accordance with the present invention can be manufactured from any of the known materials from which contact lens are made, preferably only those of the highest optical transmission properties are used, for example, CSI (see U.S. Pat. Nos. 3,957,362 and 4,056,496) or rigid gas permeable materials.

I claim:

1. A contact lens (1) having a front surface having refractive power and a back surface intended in use to fit on the cornea of the eye of the wearer, said lens comprising:
   (a) a first optical zone (2) which is adapted to compensate for spherical aberration of the eye over a portion of the lens wherein the lens has a front surface which is configured to be an aspheric parabolic or hyperbolic surface thereby compensating for spherical aberration in the eye: and
   (b) a second optical zone (3) having a refractive power less than that of the first zone and configured to provide some peripheral vision.

2. A contact lens (1) according to claim 1 wherein the first optical zone (2) has a refractive power which differs from the power of the second optical zone (3) by an amount which is within the blur tolerance limit of the eye.

3. A contact lens according to claim 2 wherein the difference between the powers of the two zones (2,3) is from about 0.5 to 0.75 diopters.

4. A contact lens according to claim 2 wherein the first optical zone (2) comprises a central portion and the second optical zone (3) comprises an annular portion which surrounds the first optical zone.

5. A contact lens according to claim 4 wherein the central portion is circular and has a diameter of between about 4 mm and 6 mm and the annular portion has an outer diameter of at least about 8 mm.

6. A contact lens according to claim 7 wherein the central circular portion has a diameter of between about 4.5 and 5.5 mm.

7. A contact lens according to claim 1 wherein the first optical zone has an aspheric rear surface.

8. A contact lens according to claim 7 wherein the aspheric rear surface is parabolic or hyperbolic.

9. A contact lens according to claim 1 wherein the second optical zone has a refractive power which is up to 1 diopter weaker than the first optical zone.

10. A contact lens according to claim 1 wherein the contact lens (1) is fabricated from at least a first and a second optical material, each optical material having different refractive indices.

11. A contact lens according to claim 10 wherein one optical material is encased in the other optical material.

12. A contact lens according to claim 11 wherein the encased optical material is provided as one or more segments (14).

13. A contact lens according to claim 12 wherein at least one of the segments (14) of the encased optical material has a surface which forms a surface with one of the back or the front surfaces of the contact lens.

14. A contact lens according to claim 1 wherein the second optical zone (3) has a surface which is nominally spherical.

15. A contact lens according to claim 1 which has a toric correction on its front or back surfaces.

16. A contact lens according to claim 1 which includes one or more additional optical zones, said additional optical zones being configured to contribute to improved peripheral vision.

17. A contact lens (1) having first and second optical zones (2,3) wherein the first zone (1) is configured to provide an aplanatic fit and the second zone (3) is configured to provide improved peripheral vision.

18. A contact lens according to claim 17 which includes one or more additional optical zones, said additional optical zones being configured to contribute to improved peripheral vision.

* * * * *

UNITED STATES PATENT AND TRADEMARK OFFICE
CERTIFICATE OF CORRECTION

PATENT NO. : 5,771,088
DATED : June 23, 1998
INVENTOR(S) : Perrott

It is certified that error appears in the above-identified patent and that said Letters Patent is hereby corrected as shown below:

On the title page, item [56], insert the following:

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 5 | 2 | 2 | 8 | 5 | 2 | 01/13/93 | EPO | | | | |
| | | | | | | | | | | | | | | |

FOREIGN PATENT OR PUBLISHED FOREIGN PATENT APPLICATION

Signed and Sealed this

Sixteenth Day of February, 1999

Attest:

Attesting Officer

Acting Commissioner of Patents and Trademarks